(12) United States Patent
Oh et al.

(10) Patent No.: US 12,543,128 B2
(45) Date of Patent: Feb. 3, 2026

(54) POWER CONTROL METHOD AND APPARATUS FOR WIRELESS COMMUNICATION USING SPREAD SPECTRUM

(71) Applicant: ELECTRONICS AND TELECOMMUNICATIONS RESEARCH INSTITUTE, Daejeon (KR)

(72) Inventors: Jin Hyung Oh, Daejeon (KR); Kyu Min Kang, Daejeon (KR); Jae Cheol Park, Daejeon (KR); Dong Woo Lim, Daejeon (KR); Su Na Choi, Daejeon (KR); Sung Hyun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 387 days.

(21) Appl. No.: 18/126,622

(22) Filed: Mar. 27, 2023

(65) Prior Publication Data

US 2023/0319737 A1 Oct. 5, 2023

(30) Foreign Application Priority Data

Apr. 4, 2022 (KR) ........................ 10-2022-0041532

(51) Int. Cl.
*H04W 52/48* (2009.01)
*H04W 52/22* (2009.01)
*H04W 52/24* (2009.01)

(52) U.S. Cl.
CPC ........... *H04W 52/48* (2013.01); *H04W 52/22* (2013.01); *H04W 52/242* (2013.01)

(58) Field of Classification Search
CPC ... H04W 52/48; H04W 52/22; H04W 52/242; H04W 52/367; H04W 28/06;
(Continued)

(56) References Cited

U.S. PATENT DOCUMENTS 6,917,602 B2 7/2005 Toskala et al.
8,423,073 B2 4/2013 Gorokhov et al.
(Continued)

FOREIGN PATENT DOCUMENTS

CN 110401962 A * 11/2019 .......... H04W 28/065

*Primary Examiner* — Lana N Le
(74) *Attorney, Agent, or Firm* — LRK PATENT LAW FIRM

(57) ABSTRACT

A power control method for reducing power consumption of a terminal during retransmission in a wireless communication system using spread spectrum may include: transmitting a response message corresponding to a request message received from a base station to the base station; determining whether an acknowledgement (ACK) message is received from the base station in response to the response message; after the ACK message is received, determining whether the response message is decoded by the base station on the basis of the ACK message; and when it is determined that the response message is not decoded by the base station, setting retransmission transmission power randomly.

6 Claims, 7 Drawing Sheets

(58) Field of Classification Search
CPC ....... H04W 80/02; Y02D 30/70; H04B 1/707; H04L 1/0081; H04L 1/1671; H04L 2012/6448; H04L 2101/622; H04L 69/22; H04L 5/0055; H04L 69/322; H04L 2101/604; H04L 63/0245; H04L 5/0044
See application file for complete search history.

(56) References Cited

U.S. PATENT DOCUMENTS

| | | | |
|---|---|---|---|
| 8,498,661 B2 | 7/2013 | Bhushan et al. | |
| 8,554,153 B2 | 10/2013 | Haartsen | |
| 2001/0033579 A1* | 10/2001 | Nelson | H04W 52/50 |
| 2002/0118729 A1* | 8/2002 | Lomp | H04L 1/0081 |
| 2003/0223452 A1* | 12/2003 | Toskala | H04W 52/50 |
| | | | 370/442 |
| 2005/0032536 A1* | 2/2005 | Wei | H04W 52/48 |
| | | | 455/517 |
| 2010/0329163 A1* | 12/2010 | Aoki | H01Q 3/30 |
| | | | 370/311 |
| 2011/0111708 A1* | 5/2011 | Tu | H04W 52/028 |
| | | | 455/82 |
| 2020/0252880 A1* | 8/2020 | Lei | H04W 24/08 |
| 2022/0311567 A1* | 9/2022 | Tran | H04W 28/06 |
| 2022/0346025 A1* | 10/2022 | Zhang | H04W 52/242 |

* cited by examiner

POWER CONTROL METHOD AND APPARATUS FOR WIRELESS COMMUNICATION USING SPREAD SPECTRUM

CROSS-REFERENCE TO RELATED APPLICATION(S)

This application claims priority to Korean Patent Application No. 10-2022-0041532, filed on Apr. 4, 2022 with the Korean Intellectual Property Office (KIPO), the entire contents of which are hereby incorporated by reference.

BACKGROUND

1. Technical Field

Example embodiments of the present disclosure relate to a power control method for wireless communication, and more specifically, to a power control method and apparatus for minimizing power consumption during retransmission in consideration of a capture effect in a two-way wireless communication method using spread spectrum.

2. Description of Related Art

Currently, in a two-way wireless communication method, when retransmission is performed due to initial transmission failure, data is transmitted after increasing transmission power in retransmission or transmitted at a low data rate after lowering a modulation order in order to improve a transmission success rate, and thus it is possible to receive the data with a high success rate in retransmission.

That is, in the case of a wireless local area network (WLAN) using spread spectrum, a station (STA) granted access to a channel in a carrier-sense multiple access with collision avoidance (CSMA/CA) method transmits data to an access point (AP), and then, when the STA does not receive transmission success information from the AP, lowers a modulation order and retransmits the data to the AP at a low data rate.

In the case of long range (LoRa) technology that uses chirp spread spectrum (CSS), which is a representative spread spectrum communication method, since the LoRa uses ALOHA rather than CSMA/CA as a channel access protocol, there is a high possibility of collision in transmission between multiple nodes. When a plurality of nodes simultaneously transmit data and a collision occurs, a transmission success rate decreases and the number of retransmissions increases, which causes an increase in power consumption of the node.

In a general wireless communication system, as a method of minimizing power consumption of each node, the following three methods, that is, a method of improving a transmission success rate, a method of reducing transmission power, and a method of being operated in a standby mode when transmitting data and in a sleep mode when not transmitting data, are mainly discussed.

In the method of improving the transmission success rate, which is a first low-power method, it is possible to solve a large part of the method by applying a protocol that adjusts multiple nodes not to participate in transmission at the same time, and in the method of reducing the transmission power, which is a second low-power method, it is possible to reduce the transmission power by applying a better transmission method and calculating an optimal transmission power considering power of a received message. Lastly, in the method of being operated in the standby mode only when transmitting data, it is possible to reduce power consumption in a section where there is no data to be separately transmitted or received, by activating a state of a terminal only when there is data to be transmitted or received.

Meanwhile, with development of next-generation wireless communication technologies such as fifth-generation (5G) new radio (NR) mobile communication or subsequent sixth-generation (6G) mobile communication, even in the WLAN, which is one of various wireless communication systems, a technology in which a channel bonding technology is used for high-speed data transmission has emerged.

A method of using a channel bonding technology in the WLAN increases a data transmission rate by combining an additional band with a basic band. When referring to the Institute of Electrical and Electronics Engineers (IEEE) 802.11ac standard, such type of technology supports a maximum bandwidth of 160 MHz by combining eight 20 MHz channels. However, there is a problem in that power consumption of communication nodes increases when the channel bonding technology is used. In particular, in small communication devices which use batteries and are portable, it is necessary to increase the usage time of the device based on a fully charged battery.

SUMMARY

Accordingly, example embodiments of the present disclosure are provided to substantially obviate one or more problems due to limitations and disadvantages of the related art.

Example embodiments of the present disclosure provide to a power control method and apparatus in a wireless communication method using spread spectrum, which are capable of improving a transmission success rate of transmission nodes on the basis of a capture effect in a reception node by controlling a difference in signal intensity between signals retransmitted from the transmission nodes.

Example embodiments of the present disclosure also provide to a power control method and apparatus in a two-way wireless communication system using spread spectrum, which are capable of minimizing power consumption of a communication node by maximizing a capture effect.

Example embodiments of the present disclosure also provide to a power control method and apparatus in a two-way wireless communication system using spread spectrum, which are capable of minimizing power consumption of a communication node by improving a transmission success rate.

According to a first exemplary embodiment of the present disclosure, a power control method for reducing power consumption of a terminal during retransmission in a wireless communication system using spread spectrum may comprise: transmitting a response message corresponding to a request message received from a base station to the base station; determining whether an acknowledgement (ACK) message is received from the base station in response to the response message; after the ACK message is received, determining whether the response message is decoded by the base station on the basis of the ACK message; and when it is determined that the response message is not decoded by the base station, setting retransmission transmission power randomly.

The power control method may further comprise, when it is determined that the response message is decoded by the base station, entering a standby mode for waiting for a next request message to be received from the base station in order to repeatedly perform a power control protocol procedure.

A format of the ACK message may include a preamble, a physical header (PHDR), a media access control (MAC) header (MHDR), a first payload (Payload1), and a cyclic redundancy check (CRC).

The MHDR may include information on a message type, a base station MAC (BS MAC) address, and a length of the first payload (Payload1 Length).

The format of the ACK message may further include a second payload (Payload2) between the first payload and the CRC.

The MHDR further may include information on a length of the second payload next to the length of the first payload.

According to a second exemplary embodiment of the present disclosure, a power control method for reducing power consumption of a terminal during retransmission in a wireless communication system using spread spectrum may comprise: measuring terminal reception power from a request message transmitted from a base station; calculating a pathloss using a terminal antenna gain, which is information known by the terminal, and base station transmitter information, wherein the base station transmitter information includes a base station antenna gain and base station transmission power; calculating a minimum reception level that varies according to spreading code or a spreading factor using the pathloss; calculating terminal transmission power that allows the base station to secure a minimum reception level using the pathloss and the minimum reception level; initially transmitting a response message to the base station with the terminal transmission power; determining whether the response message is normally received by the base station through an acknowledgement (ACK) message of the base station; and when it is determined that the response message is not normally received by the base station, setting retransmission transmission power to random power.

The power control method may further comprise, before the setting of the retransmission transmission power to the random power is performed, determining whether the transmission has failed due to collision.

The power control method may further comprise, as a result of the determination in the determining of whether the transmission has failed due to collision, when it is determined that the transmission has not failed due to collision, setting the retransmission transmission power upward to be a preset level, wherein the setting of the retransmission transmission power to the random power is performed when it is determined that the transmission has failed due to collision as the result of the determination in the determining of whether the transmission has failed due to collision.

The pathloss may be determined to be a value obtained by subtracting the terminal reception power from a value obtained by adding the base station transmission power, the base station antenna gain, and the terminal antenna gain.

The terminal transmission power may be determined to be a value obtained by subtracting each of the terminal antenna gain and the base station antenna gain from the pathloss and adding the minimum reception level to the obtained value.

A format of the ACK message may include a preamble, a physical header (PHDR), a media access control (MAC) header (MHDR), a first payload (Payload1), and a cyclic redundancy check (CRC), and the MHDR may include information on a message type, a base station MAC (BS MAC) address, and a length of the first payload (Payload1 Length).

The format of the ACK message may further include a second payload (Payload2) between the first payload and the CRC, and the MHDR may further include information on a length of the second payload next to the length of the first payload.

The power control method may further comprise, when it is determined that the response message is decoded by the base station, entering a standby mode for waiting for a next request message to be received from the base station.

The terminal may return to the determining of whether the ACK message is received after transmitting a retransmission response message in order to repeatedly perform a power control protocol procedure.

According to a third exemplary embodiment of the present disclosure, a power control apparatus for reducing power consumption of a terminal during retransmission in a wireless communication system using spread spectrum may comprise: a processor; and a memory configured to store a program command executed by the processor, wherein, when the program command is executed by the processor, the processor is configured to perform transmitting a response message corresponding to a request message received from a base station to the base station, determining whether an acknowledgement (ACK) message is received from the base station in response to the response message, after the ACK message is received, determining whether the response message is decoded by the base station on the basis of the ACK message, and when it is determined that the response message is not decoded by the base station, setting retransmission transmission power randomly.

The processor may be configured to further perform, before the setting of the retransmission transmission power to the random power is performed, determining whether the transmission has failed due to collision.

The processor may be configured to further perform, as a result of the determination in the determining of whether the transmission has failed due to collision, when it is determined that the transmission has not failed due to collision, setting the retransmission transmission power upward to be a preset level, and the setting of the retransmission transmission power to the random power may be performed when it is determined that the transmission has failed due to collision as the result of the determination in the determining of whether the transmission has failed due to collision.

The processor may be configured to further perform, when it is determined that the response message is decoded by the base station, entering a standby mode for waiting for a next request message to be received from the base station in order to repeatedly perform a power control protocol procedure.

A format of the ACK message may include a preamble, a physical header (PHDR), a media access control (MAC) header (MHDR), a first payload (Payload1), and a cyclic redundancy check (CRC), and the MHDR may include information on a message type, a base station MAC (BS MAC) address, and a length of the first payload (Payload1 Length).

The format of the ACK message may further include a second payload (Payload2) between the first payload and the CRC, and the MHDR may further include information on a length of the second payload next to the length of the first payload.

According to example embodiments of the present disclosure, in a wireless communication system in which a spread spectrum method using spreading code is used, when a difference in reception power between signals received by communication nodes is a certain level or higher, instead of unconditionally setting a higher power than initially set power when retransmitting data using a principle that decoding is possible, the communication nodes entering retransmission randomly set the transmission power and the reception node receives the signal through a capture effect, and thus it is possible to improve the transmission success rate of the communication nodes. Accordingly, it is possible to perform wireless communication while minimizing power consumption of each communication node.

DETAILED DESCRIPTION OF THE EMBODIMENTS

Figure 1:
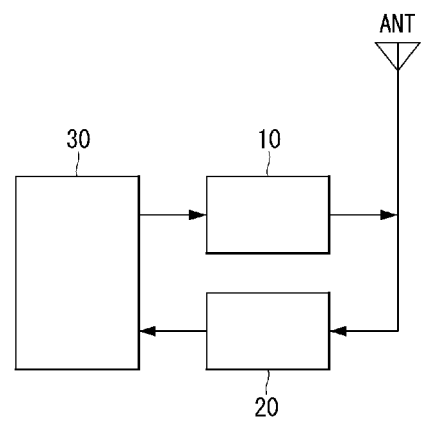
FIG. 1 is a schematic block diagram of a power control apparatus for wireless communication using spread spectrum according to an embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a schematic block diagram of a power control apparatus for wireless communication using spread spectrum according to an embodiment of the present disclosure.

Referring to FIG. 1, the power control apparatus is an apparatus that performs wireless communication with a base station (BS) 50 or an access point, and may include a transmitter 10, a receiver 20, and a controller 30. Here, the BS 50 or the access point may perform wireless communication with a plurality of communication nodes each having a power control apparatus, and the communication nodes may be referred to as terminals or the like.

The transmitter 10 transmits a signal containing data to the outside through an antenna ANT under the control of the controller 30. The receiver 20 may convert a signal received through the antenna ANT into a baseband signal under the control of the controller 30 and transmit the baseband signal to the controller 30. The transmitter 10 and the receiver 20 may be formed as a communication unit in the form of a single module.

The controller 30 may control all the components of the power control apparatus including the transmitter 10 and the receiver 20. In particular, for the purpose of minimizing power consumption of a terminal and improving a transmission success rate in wireless communication using spread spectrum, even when a plurality of transmission terminals simultaneously transmit signals in the same slot through power control between transmission terminals, for example, power value control considering a maximum value or a channel link, the controller 30 may operate to increase the probability that a signal-to-interference-plus-noise ratio (SINR) of the BS or access point is secured to be a specific value or higher.

To this end, the controller 30 may include a first module for selecting a procedure for selecting transmission power when transmission is not successful, a second module for measuring reception power of an acknowledgement (ACK) message, a third module for randomly selecting one of "0" and "1," a fourth module for setting the transmission power to maximum power when "1" is selected, and a fifth module for setting the transmission power to random power when "0" is selected.

Further, the controller 30 may include a module for determining whether the transmission has failed due to collision, a module for resetting the transmission power to random power when it is determined that the transmission has failed due to collision, and a module for increasing the transmission power when it is determined that the transmission has not failed due to collision.

Figure 2:
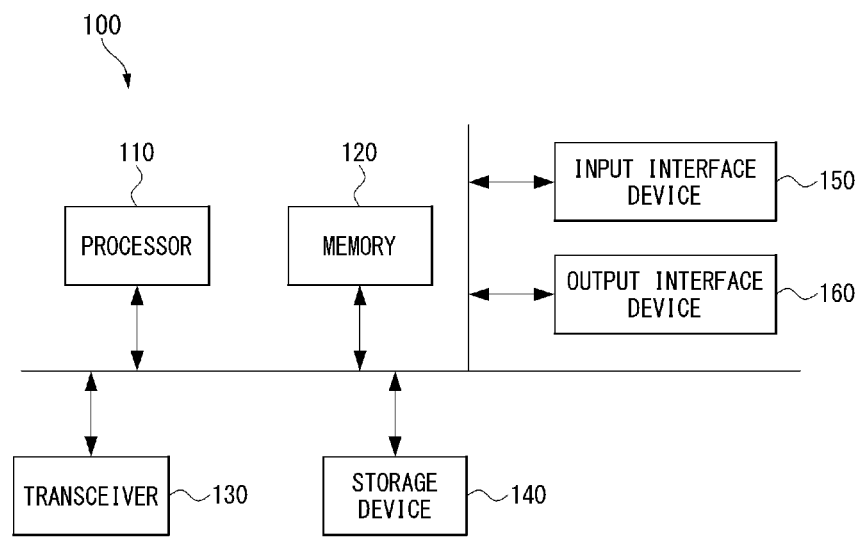
FIG. 2 is a schematic block diagram of a terminal in which the power control apparatus of FIG. 1 may be applied.

FIG. 2 is a schematic block diagram of a terminal in which the power control apparatus of FIG. 1 may be applied.

Referring to FIG. 2, a terminal 100 may include at least one processor 110, a memory 120, and a transceiver 130 that includes a communication subsystem capable of performing communication in a wireless communication method using spread spectrum. Also, the terminal 100 may further include a storage device 140, an input interface device 150, an output interface device 160, and the like. The respective components included in the terminal 100 may be connected through a bus to communicate with each other.

The processor 110 may execute a program command stored in at least one of the memory 120 and the storage device 140. The program command may be formed as a software module, such as at least one of the above-described modules. The processor 110 may be a central processing unit (CPU), a graphics processing unit (GPU), or a dedicated processor in which at least one of methods according to embodiments of the present disclosure is performed. For example, the processor 110 may correspond to the controller 30 of FIG. 1.

Each of the memory 120 and the storage device 140 may be formed as at least one of a volatile storage medium and a non-volatile storage medium. For example, the memory 120 may be formed as at least one of a read only memory (ROM) and a random-access memory (RAM).

The transceiver 130 may include a subsystem for performing wireless communication with a BS or an access point. The input interface device 150 may include at least one input unit selected from among input units such as a keyboard, a microphone, a touch pad, a touch screen, and the like, and an input signal processing unit that maps or processes a signal input through the at least one input unit with a pre-stored command. The output interface device 160 may include an output signal processing unit that maps or processes an output signal with a pre-stored signal type or level under the control of the processor 110, and at least one output unit that outputs a signal or information in the form of vibrations, light, or the like according to the signal of the output signal processing unit. The at least one output unit may include at least one output unit selected from among output units such as a speaker, a display device, a printer, an optical output device, a vibration output device, and the like.

The terminal 100 may be a device that transmits a signal to a BS or an access point and receives a signal from the BS or the access point in a wireless communication method using spread spectrum. Such a terminal is a type of wireless communication terminal and needs to be operated to minimize power consumption.

That is, in order to improve a transmission success rate in a wireless communication system, retransmission should be performed, and the most ideal method is to complete the retransmission successfully within a short period of time during retransmission. However, in the case of the conventional wireless communication system, transmission power was simply increased in order to improve a transmission success rate during retransmission, whereas in a system to which a communication method using spread spectrum is applied, it is not a good method in terms of the transmission success rate that most communication nodes maximize transmission power during retransmission.

Meanwhile, in the wireless communication system, when retransmission is performed due to data transmission failure, it is more advantageous in the wireless communication system using spread spectrum that a communication node retransmits with random power rather than retransmits with higher power than the previous transmission. The reason is that a gain is generated due to a capture effect.

For example, when all transmission nodes positioned in similar positions transmit signals with maximum power, there is a high probability that the intensities of power received by reception nodes are almost the same. In such a situation, a size of a signal recognized as interference and a size of its own signal are almost similar, and thus it is difficult to decode the signal.

In the same situation as above, when a specific node among communication nodes positioned adjacent to each other transmits signals with maximum power and another specific node transmits signals with low power, the intensities of power received by uplink reception nodes such as a BS and the like are different, and thus the probability that a signal of an uplink transmission node received as a stronger signal is more likely to be decoded by the reception node is increased.

In particular, in the wireless communication system to which the communication method using spread spectrum is applied, a lower-level signal may be decoded due to the use of spreading code, and thus the probability that the signal is decoded may be higher even when an interference signal is large or the intensity of the own signal is small.

That is, when a plurality of transmission nodes simultaneously transmit signals in the same slot, the intensity of an interference signal is high, and thus, even when an SINR of the signal is secured low, there is a high probability that decoding is possible when the SINR is greater than or equal to a specific value in the communication method using spread spectrum.

Therefore, even when a plurality of communication nodes simultaneously retransmit signals in the same slot through power control between the communication nodes, for example, power value control considering a maximum value or a channel link, for the purpose of minimizing power consumption and improving a transmission success rate, the power control method and apparatus according to the present embodiment are configured to increase the probability that an SINR of a specific reception node such as a BS or an access point is secured to be a specific value or higher.

Figure 3:
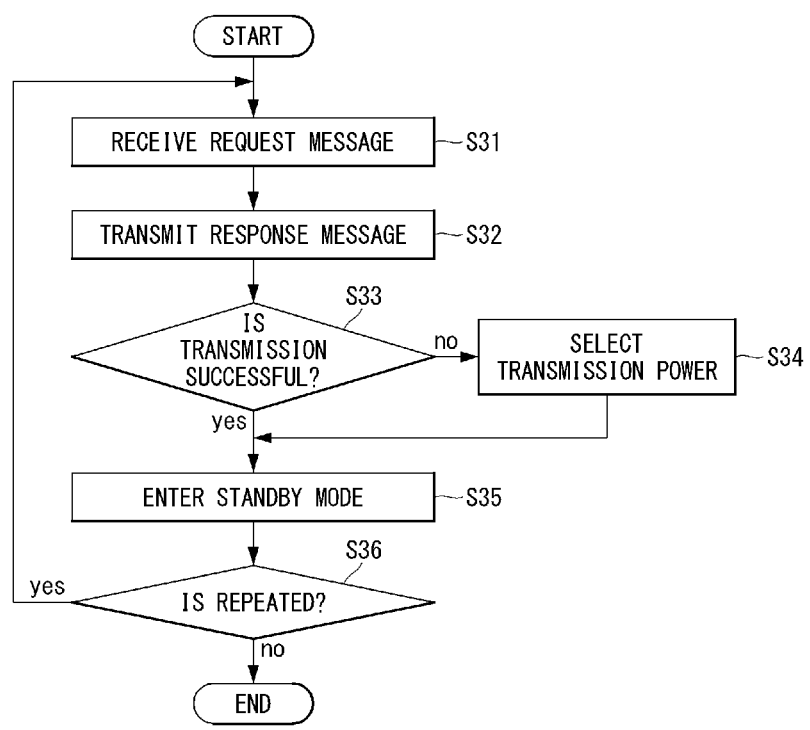
FIG. 3 is a flowchart for describing a power control protocol procedure that can be applied to a method of controlling power for a terminal in a wireless communication system according to another embodiment of the present disclosure.

FIG. 3 is a flowchart for describing a power control protocol procedure that can be applied to a method of controlling power for a terminal in a wireless communication system according to another embodiment of the present disclosure.

Referring to FIG. 3, the terminal receives a request message transmitted from a BS (S31).

Next, the terminal transmits a response message to the BS (S32). The terminal that transmits the response message receives an ACK message transmitted from the BS.

Next, after the terminal receives the ACK message, when it is determined that the response message is successfully decoded on the basis of the ACK message, the terminal enters a standby mode (S35). Then, in order to repeatedly perform the power control protocol procedure, the terminal may wait for a next request message to be received from the BS or terminate the current process (S36).

Meanwhile, after the terminal receives the ACK message, when it is determined that the decoding of the response message is not successfully performed on the basis of the ACK message, the terminal enters a transmission power selection mode for setting power to be transmitted during retransmission (S34). A procedure related to the setting of the power to be transmitted during retransmission will be described with reference to FIG. 4. When the terminal terminates the setting of the power to be transmitted during retransmission, the terminal enters a mode for waiting for a next retransmission request message to be received from the BS (S35). The terminal that has entered the standby mode may determine whether to continue the transmission depending on whether there is a next message to be transmitted.

When it is determined that the BS did not receive the previously transmitted response message on the basis of the ACK message, the terminal enters a mode for setting power to be transmitted in the retransmission operation, and a detailed description of the procedure will be given with reference to FIG. 4.

Figure 4:
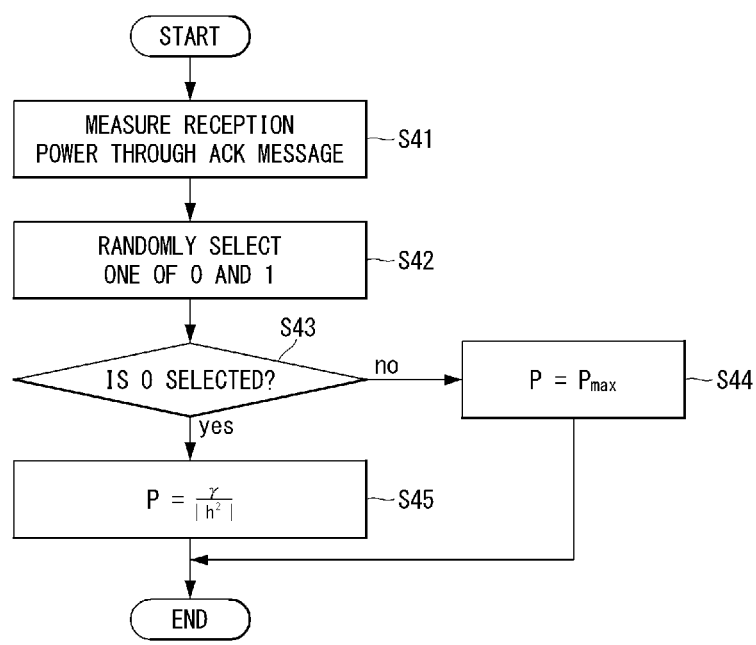
FIG. 4 is a flowchart for describing a retransmission transmission power setting protocol that can be applied to the power control method of FIG. 3.

FIG. 4 is a flowchart for describing a retransmission transmission power setting protocol that can be applied to the power control method of FIG. 3.

Referring to FIG. 4, when it is determined that the response message did not reach the BS normally on the basis of the ACK message transmitted from the BS, the terminal measures reception power which is measured when receiving the ACK message to measure a channel state of a link (S41). The channel state of the link may be defined as $|h^2|$.

The terminal measures the channel state and then randomly selects one of "0" and "1" (S42).

When the terminal selects "1," the terminal sets retransmission transmission power P to maximum power Pmax (S44). Meanwhile, when the terminal selects "0," the terminal sets the retransmission transmission power P to a value obtained by dividing a minimum reception level γ by the channel state of the link (S45).

The retransmission transmission power obtained by dividing the minimum reception level by the channel state of the link is expressed as Equation 1 below.

$$P = \frac{\gamma}{|h^2|}$$ [Equation 1]

The retransmission transmission power setting protocol including the above-described transmission power setting method to be used for initial transmission of the response message will be described below with reference to FIG. 5.

Figure 5:
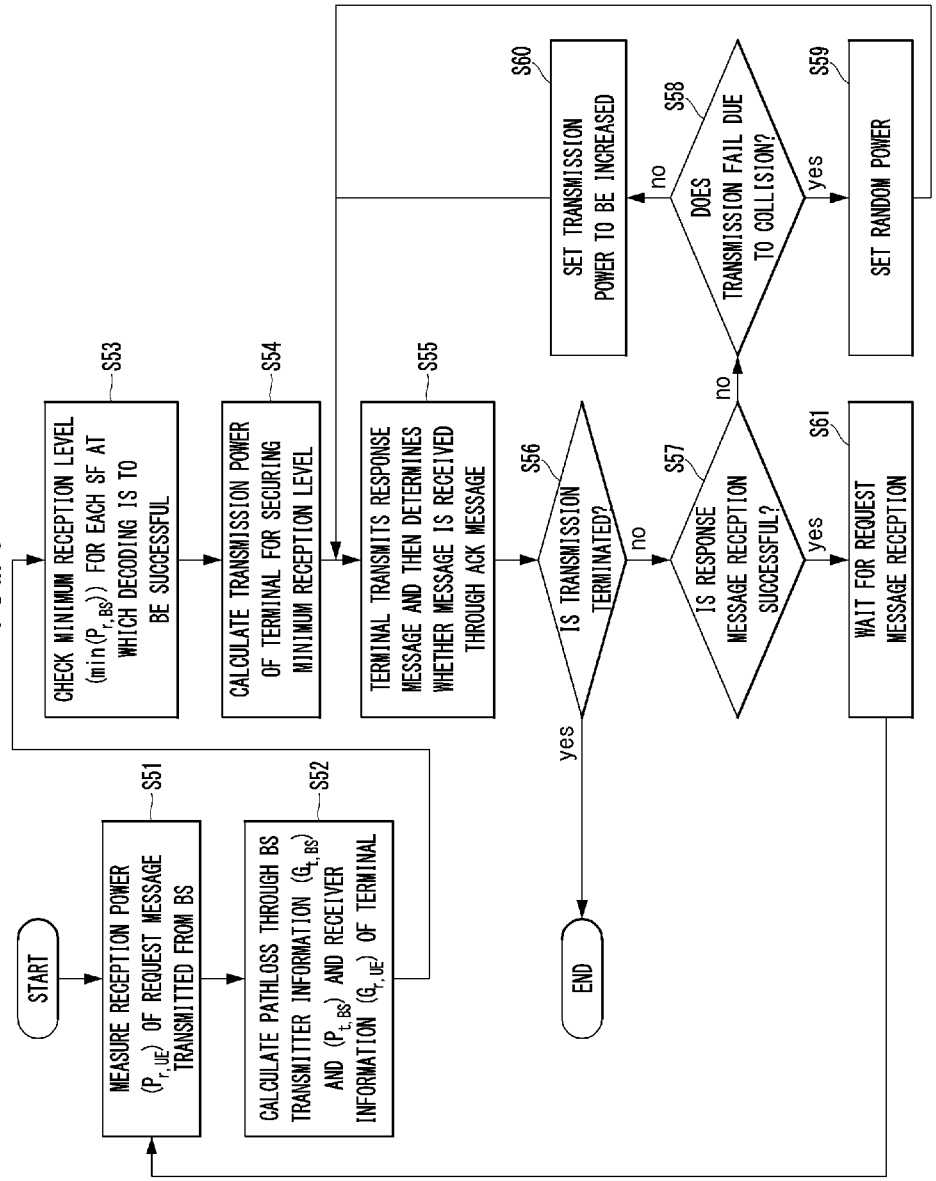
FIG. 5 is a flowchart for describing a retransmission transmission power setting protocol that can be applied to the power control method of FIG. 3, focusing on the case in which it is possible to determine whether a plurality of terminals have accessed a slot.

FIG. 5 is a flowchart for describing a retransmission transmission power setting protocol that can be applied to the power control method of FIG. 3, focusing on the case in which it is possible to determine whether a plurality of terminals have accessed a slot.

Referring to FIG. 5, a terminal measures terminal reception power $P_{r,UE}$ of a request message transmitted from a BS (S51). Then, the terminal calculates a pathloss PL through a terminal antenna gain $G_{r,UE}$, which is already known information, and BS transmitter information (S52). The BS transmitter information includes a BS antenna gain $G_{t,BS}$ and BS transmission power $P_{t,BS}$.

The pathloss PL[dB] calculated in operation S52 may be expressed as Equation 2 below.

$$PL[dB]=P_{t,BS}+G_{t,BS}+G_{r,UE}-P_{r,UE}$$ [Equation 2]

Next, in the case of spreading code, for example, LoRa technology, a minimum reception level that varies depending on a spreading factor (SF) is checked using the pathloss PL calculated above (S53). The minimum reception level refers to a minimum reception power level at which the signal received from the BS may be successfully decoded.

Next, transmission power $P_{t,UE}$ of the terminal, with which a minimum reception level of the BS may be secured, is calculated using the pathloss PL and a minimum reception level $\min(P_{r,BS})$, as expressed in Equation 3 below (S54).

$$P_{t,UE}=PL-G_{r,UE}G_{r,BS}+\min(P_{r,BS})$$ [Equation 3]

In Equation 3, $G_{t,UE}$ denotes the terminal antenna gain, and $G_{t,BS}$ denotes the BS antenna gain.

Next, the terminal initially transmits a response message with the previously calculated transmission power and then determines a result of the reception of the response message through the ACK message (S55). In the case in which the transmission continues, when it is determined that the reception of the response message has failed, the terminal determines whether the transmission has failed due to collision. The whether the reception of the response message has failed may be determined through the ACK message.

As a result of the determination, when it is determined that the transmission has failed due to collision, the power of the terminal is randomly set, and when it is determined that the transmission has not failed due to collision, that is, when a link error occurs, the transmission power is simply set to be increased.

That is, in a state in which the transmission of the response message is not terminated (S56), when it is determined that the BS successfully receives the response message (yes in S57), the terminal may wait for a next request message to be received from the BS (S61).

Meanwhile, in a state in which the transmission of the response message is not terminated (S56), when it is determined that the BS does not successfully receive the response message (no in S57), the terminal determines whether the transmission has failed due to collision (S58).

As a result of the determination in operation S58, when it is determined that the transmission has failed due to collision (yes in S58), the terminal may set retransmission transmission power to random power (S59), transmit a response message, and then return to operation S55 of determining whether the reception of the response message has failed through the ACK message.

Meanwhile, as the result of the determination in operation S58, when it is determined that the transmission has not failed due to collision (no in S58), the terminal may simply increase the transmission power by a predetermined size or set to the maximum power upward (S60), transmit the response message, and then return to operation S55 of determining whether the reception of the response message has failed through the ACK message.

According to the present embodiment, when it is possible to determine whether a plurality of terminals have accessed a slot, the terminal may set the transmission power to be used for initial transmission of the response message, and increase the retransmission transmission power of the terminal or set the retrains mission transmission power to the random power according to whether the transmission has failed due to collision during retransmission, thereby significantly reducing power consumption of the terminal.

Examples of the request message transmitted by the BS and the response message transmitted by the terminal are as follows.

Figure 6:
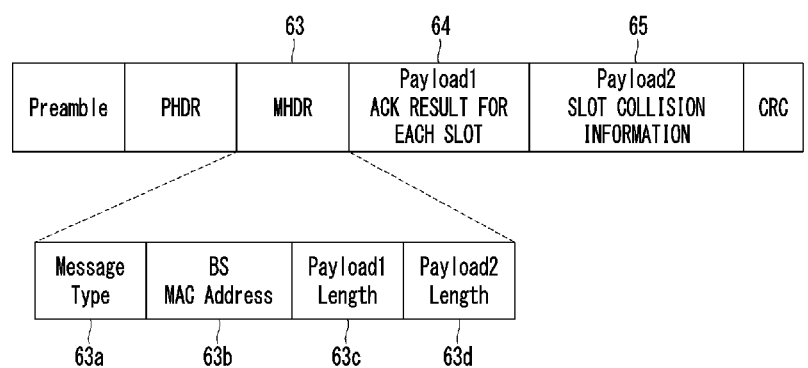
FIG. 6 is a configuration diagram of a format of an ACK message of a BS that can be applied to the power control method of FIG. 3.
Figure 7:
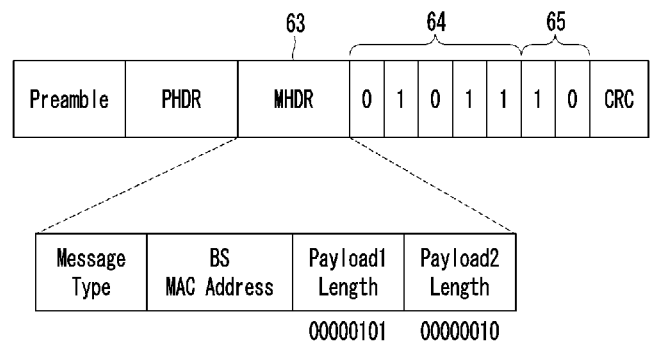
FIG. 7 is a diagram of an example of use of the format of the ACK message of FIG. 6.

FIG. 6 is a configuration diagram of a format of an ACK message of a BS that can be applied to the power control method of FIG. 3. FIG. 7 is a diagram of an example of use of the format of the ACK message of FIG. 6.

Referring to FIG. 6, a message for determining whether a response message is well received by the BS is an ACK message transmitted from the BS to the terminal. The ACK message of the present embodiment has a format including a preamble, a physical header (PHDR), a media access control (MAC) header (MHDR) 63, a first payload (Payload1) 64, a second payload (Payload2) 65, and a cyclic redundancy check (CRC).

In the format of the ACK message, the MHDR 63 may include information on a message type 63a, a BS MAC address 63b, a length of the first payload (Payload1 Length) 63c, and a length of the second payload (Payload2 Length) 63d.

The first payload 64 may include information on an ACK result for each slot, and the second payload 65 may include information on whether there is slot collision when the ACK message is not received (NO ACK).

For example, when the number of response slots is 5 and the transmission has failed in two first and third slots, the format of the ACK message may be expressed in the form shown in FIG. 7. The length of the first payload may have a value of "00000101" corresponding to 5, and the length of the second payload may have a value of "00000010" indicating two values of "0" and "1" indicating whether there is slot collision when the ACK message is not received (NO ACK).

In FIG. 7, the ACK result for each of the five slots expressed in the first payload 64 indicates that the data of the terminal transmitted in the second slot, the fourth slot, and the fifth slot among the transmission slots of the response message are normally received by the BS. In addition, the ACK result indicates that the data of the terminal transmitted in the first slot and the third slot are not normally received by the BS.

In the case in which the above-described format of the ACK message is used, when it is possible to determine that a plurality of terminals have accessed a single slot, the slot to which the plurality of terminals transmit data may be expressed by "1" in the second payload 65, the terminals that access the corresponding slot may be aware of whether there is a slot collision, a slot in which one terminal transmits data but fails to transmit due to a link error or the like may be expressed by "0" in the second payload 65, and the terminals that access the corresponding slot may be aware of transmission failure.

When it is not possible to determine that a plurality of terminals have accessed a single slot, the BS may transmit the ACK message containing "0" to all slots in which reception has failed. In this case, the second payload indicating whether there is a slot collision may be omitted from the corresponding ACK message.

Figure 8:
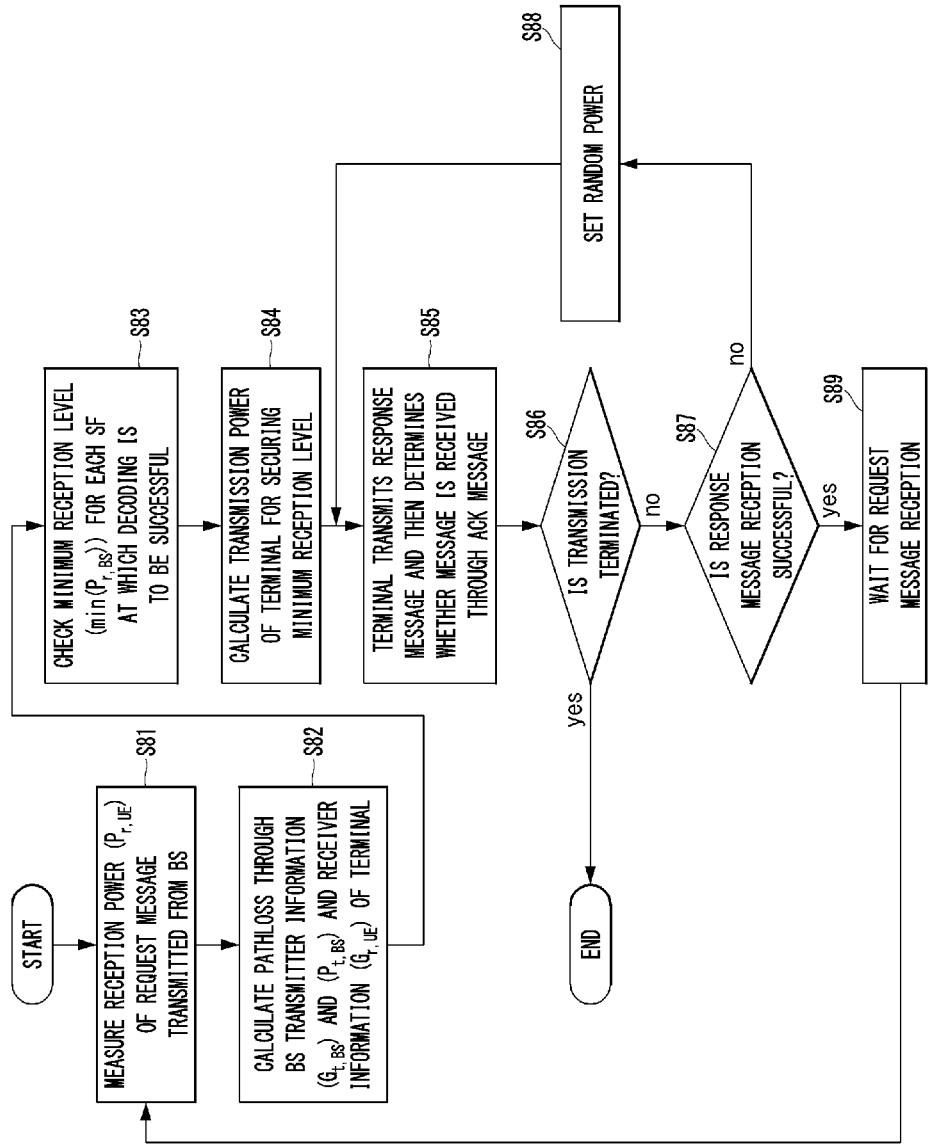
FIG. 8 is a flowchart for describing another transmission power setting method that can be applied to the power control method of FIG. 3.

FIG. 8 is a flowchart for describing another transmission power setting method that can be applied to the power control method of FIG. 3.

Referring to FIG. 8, a terminal measures terminal reception power $P_{r,UE}$ of a request message transmitted from a BS (S81). Then, the terminal calculates a pathloss PL through a terminal antenna gain $G_{r,UE}$, which is already known information, and BS transmitter information (S82). The BS transmitter information includes a BS antenna gain $G_{t,BS}$ and BS transmission power $P_{t,BS}$. The pathloss PL[dB] calculated in operation S82 may be expressed as Equation 2 above.

Next, in the case of spreading code, for example, LoRa technology, a minimum reception level $\min(P_{r,BS})$ that varies depending on an SF is checked using the pathloss PL calculated above (S83). The minimum reception level refers to a minimum reception power level at which the signal received from the BS may be successfully decoded.

Next, transmission power $P_{t,UE}$ of the terminal, with which a minimum reception level of the BS may be secured, is calculated using the pathloss PL and a minimum reception level $\min(P_{r,BS})$ (S84). Terminal transmission power may be calculated through Equation 3 described above.

Next, the terminal initially transmits a response message with the previously calculated transmission power and then determines a result of the reception of the response message through the ACK message (S85).

Next, in a state in which the transmission of the response message is not terminated (S86), when it is determined that the BS successfully receives the response message (yes in S87), the terminal may wait for a next request message to be received from the BS (S89).

Meanwhile, in a state in which the transmission of the response message is not terminated (S86), t when it is determined that the BS does not successfully receive the response message (no in S87), the terminal may set retransmission transmission power to random power regardless of reasons such as a transmission failure due to collision (S88). Then, the terminal may transmit the response message and then return to operation S85 of determining whether the reception of the response message has failed through the ACK message.

According to the present embodiment, when it is not possible to determine whether the terminal have accessed a slot, the terminal may set transmission power to be used for initial transmission of the response message, and increase a transmission success rate of the terminal through a processor that sets the retransmission transmission power during retransmission, thereby minimizing power consumption of the terminal.

Figure 9:
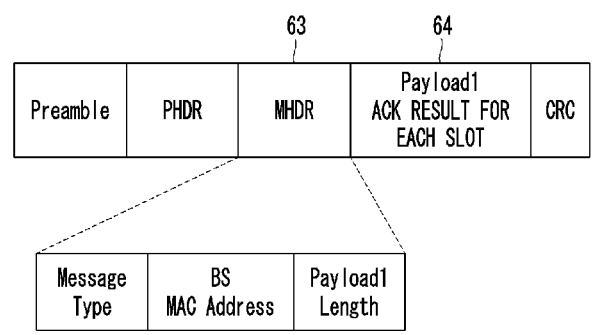
FIG. 9 is a configuration diagram of another form of a format of an ACK message of a BS that can be applied to the power control method of FIG. 8.
Figure 10:
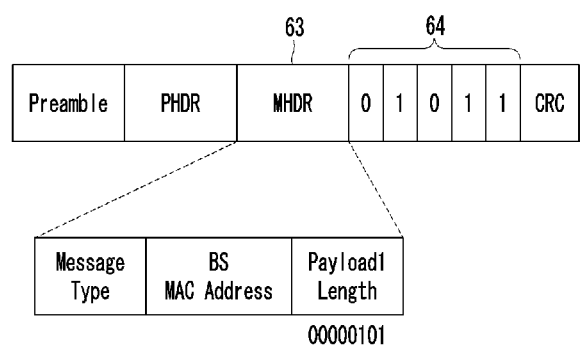
FIG. 10 is a diagram of an example of use of the format of the ACK message of FIG. 9.

FIG. 9 is a configuration diagram of another form of a format of an ACK message of a BS that can be applied to the power control method of FIG. 8. FIG. 10 is a diagram of an example of use of the format of the ACK message of FIG. 9.

That is, FIG. 9 shows a format of an ACK message used when it is not possible to determine whether a plurality of terminals have accessed a slot, and FIG. 10 shows an example of the format of the ACK message used when it is not possible to determine whether a plurality of terminals have accessed a slot.

Since the format of the ACK message of FIGS. 9 and 10 is substantially the same as the format of the ACK message of FIGS. 6 and 7 except that a second payload 65 is omitted and a part for storing information on a length of the second payload is omitted from an MHDR 63, a detailed description thereof will be omitted.

Meanwhile, the above-described communication node is basically a device equipped with a subsystem supporting a two-way wireless communication system using spread spectrum, and may be formed to further support a communication protocol specified in the 3rd Generation Partnership Project (3GPP) standard, for example, a long-term evolution (LTE) communication protocol, an LTE Advanced (LTE-A) communication protocol, a new radio (NR) communication protocol, or the like. For example, the communication node may be formed to further support one communication technology selected from among code-division multiple access (CDMA), wideband CDMA (WCDMA), time-division multiple access (TDMA), frequency-division multiple access (FDMA), orthogonal frequency-division multiplexing (OFDM), filtered OFDM, cyclic prefix (CP)-OFDM, discrete Fourier transform-spread-OFDM (DFT-s-OFDM), orthogonal frequency-division multiple access (OFDMA), single carrier (SC)-FDMA, non-orthogonal multiple access (NOMA), generalized frequency-division multiplexing (GFDM), filter bank multi-carrier (FBMC), universal filtered multi-carrier (UFMC), space-division multiple access (SDMA), and the like.

Further, the above-described communication node may be referred to as user equipment (UE), terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

In addition, the above-described BS may be referred to as a NodeB (NB), an evolved NodeB (eNB), a gNB, an advanced BS (ABS), a high reliability-BS (HR-BS), a base transceiver station (BTS), a radio BS, a radio transceiver, an access point, an access node, a radio access station (RAS), a mobile multihop relay-BS (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Further, the BS may additionally support multiple-input and multiple-output (MIMO) transmission (e.g., single user (SU)-MIMO, multi user (MU)-MIMO, massive MIMO, etc.), coordinated multipoint (CoMP) transmission, carrier aggregation (CA) transmission, transmission in unlicensed band, direct communication between terminals (device-to-device communication (D2D)) (or proximity services (ProSe)), Internet of Things (IoT) communication, dual connectivity (DC), or the like.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A power control method for reducing power consumption of a terminal during retransmission in a wireless communication system using spread spectrum, comprising:
    transmitting a response message corresponding to a request message received from a base station to the terminal;
    determining whether an acknowledgement (ACK) message is received from the base station in response to the response message;
    after the ACK message is received, determining whether the response message is decoded by the base station on the basis of the ACK message; and
    when it is determined that the response message is not decoded by the base station, setting retransmission transmission power randomly,
    wherein a format of the ACK message includes a preamble, a physical header (PHDR), a media access control (MAC) header (MHDR), a first payload (Payload1), and a cyclic redundancy check (CRC), wherein the MHDR includes information on a message type, a base station MAC (BS MAC) address, and a length of the first payload (Payload1 Length), wherein the format of the ACK message further includes a second payload (Payload2) between the first payload and the CRC, wherein the MHDR further includes information on a length of the second payload next to the length of the first payload.

2. The power control method of claim 1, further comprising, when it is determined that the response message is decoded by the base station, entering a standby mode for waiting for a next request message to be received from the base station in order to repeatedly perform a power control protocol procedure.

3. A power control apparatus for reducing power consumption of a terminal during retransmission in a wireless communication system using spread spectrum, comprising:
 a processor; and
 a memory configured to store a program command executed by the processor,
 wherein, when the program command is executed by the processor, the processor is configured to perform transmitting a response message corresponding to a request message received from a base station to the terminal,
 determining whether an acknowledgement (ACK) message is received from the base station in response to the response message,
 after the ACK message is received, determining whether the response message is decoded by the base station on the basis of the ACK message, and
 when it is determined that the response message is not decoded by the base station, setting retransmission transmission power randomly,
 wherein a format of the ACK message includes a preamble, a physical header (PHDR), a media access control (MAC) header (MHDR), a first payload (Payload1), and a cyclic redundancy check (CRC), and
 the MHDR includes information on a message type, a base station MAC (BS MAC) address, and a length of the first payload (Payload1 Length), wherein the format of the ACK message further includes a second payload (Payload2) between the first payload and the CRC, and the MHDR further includes information on a length of the second payload next to the length of the first payload.

4. The power control apparatus of claim 3, wherein the processor is configured to further perform, before the setting of the retransmission transmission power to the random power is performed, determining whether the transmission has failed due to collision.

5. The power control apparatus of claim 4, wherein the processor is configured to further perform, as a result of the determination in the determining of whether the transmission has failed due to collision, when it is determined that the transmission has not failed due to collision, setting the retransmission transmission power upward to be a preset level, and
 the setting of the retransmission transmission power to the random power is performed when it is determined that the transmission has failed due to collision as the result of the determination in the determining of whether the transmission has failed due to collision.

6. The power control apparatus of claim 3, wherein the processor is configured to further perform, when it is determined that the response message is decoded by the base station, entering a standby mode for waiting for a next request message to be received from the base station in order to repeatedly perform a power control protocol procedure.

* * * * *